United States Patent [19]
Moore

[11] Patent Number: 5,696,425
[45] Date of Patent: Dec. 9, 1997

[54] METHOD FOR MOUNTING A DEFLECTION YOKE AND SUPPORT STRUCTURE THEREFOR

[75] Inventor: George John Moore, Lancaster, Pa.

[73] Assignee: Thomson Consumer Electronics, Inc., Indianapolis, Ind.

[21] Appl. No.: 649,724

[22] PCT Filed: Dec. 16, 1993

[86] PCT No.: PCT/US93/12267

§ 371 Date: May 28, 1996

§ 102(e) Date: May 28, 1996

[87] PCT Pub. No.: WO95/17072

PCT Pub. Date: Jun. 22, 1995

[51] Int. Cl.⁶ ............... H01J 29/70; H01F 7/00
[52] U.S. Cl. ............. 313/440; 313/425; 335/210; 335/212; 348/829
[58] Field of Search ................. 313/440, 421, 313/425, 426, 427, 428; 335/210, 212, 213; 348/825, 827, 828, 829, 830, 831, 836

[56] References Cited

U.S. PATENT DOCUMENTS

| | | | |
|---|---|---|---|
| 3,986,156 | 10/1976 | Smith | 335/210 |
| 4,110,793 | 8/1978 | Tajiri | 358/248 |
| 4,117,516 | 9/1978 | Yasuhara | 358/248 |
| 4,195,315 | 3/1980 | Pydarz et al. | 358/248 |
| 4,338,584 | 7/1982 | Howard | 335/210 |
| 4,360,839 | 11/1982 | Ragland, Jr. et al. | 358/249 |
| 5,028,898 | 7/1991 | Tsukii et al. | 335/210 |
| 5,185,672 | 2/1993 | Rousseau et al. | 358/248 |

Primary Examiner—Ashok Patel
Attorney, Agent, or Firm—Joseph S. Tripoli; Joseph J. Laks; Daniel E. Sragow

[57] ABSTRACT

A deflection yoke assembly for a cathode ray tube includes four substantially equally spaced inclined mounting members arranged about the circumference of a mounting ring at the front of the yoke assembly. Each mounting member has a plunger which positions the yoke with respect to the funnel portion of the cathode ray tube. A continuously unidirectional restricting means prevents the plunger from withdrawing from the funnel portion of the cathode ray tube. A release cylinder, which is coaxial with the sleeve and plunger, releases the unidirectional means, which may be an internally toothed washer, in order to provide capability for readjustment.

9 Claims, 5 Drawing Sheets

METHOD FOR MOUNTING A DEFLECTION YOKE AND SUPPORT STRUCTURE THEREFOR

The invention relates to a deflection yoke assembly, and more particularly to such an assembly including adjustable studs about the front face of a deflection yoke for adjusting the alignment of the deflection yoke with respect to its associated cathode ray tube (CRT).

The importance of providing a deflection yoke assembly with a mechanism for permitting the yoke assembly to be adjusted relative to its orientation to an associated CRT upon which it is mounted is well known in the art.

With reference to FIG. 1, a prior art deflection yoke assembly includes a forwardmost mounting ring 22 including multiple inclined mounting studs or sleeves 24 substantially equally spaced from one another around the outer circumference of the mounting ring 22. Sleeves 24 and ring 22 are made in the same molding process as one piece. Hollow bolts 26 are threadably mounted in the mounting sleeves 24. The front or forward ends of the bolts 26 each include a contact head 28 for contacting a cone or funnel 32 of an associated CRT. Windings 30 of the deflection coil assembly 20 as shown, can be of any desired pattern.

Also shown affixed to the deflection yoke or coil assembly 20 are a standoff panel 34, and a wiring terminal ring 36 at the rear portion thereof. A sheath beam bender 38 is also shown, along with the rearmost portion 40 of the CRT. The angle of the inclined mounting sleeves 24 is predetermined to insure that contact heads 28 of hollow bolts 26 make contact with a maximum area of cone 32 of the associated CRT. Since contact head 28 of a given hollow bolt 26 has a face that is at 90° to the longitudinal axis of such a hollow bolt 26, the angles of each mounting sleeves 24 are such that the longitudinal axis of the hollow bolt 26 is perpendicular to the point where the axes intersect the wall of the cone 32. In this manner, alignment of the deflection of the yoke 20 to the CRT is provided.

The adjustment of hollow bolts 26 tends to be a slow process because the torque, which is applied to turn them, is very critical. Furthermore, when the hollow bolts contact the funnel portion of the tube, they may tend to rotate the yoke with respect to the tube, thus making the alignment of the yoke with respect to the tube less accurate than would be desired.

It has been proposed to use a ratchet arrangement instead of the threaded bolt arrangement shown in FIG. 1. In such a prior art ratchet arrangement, a toothed core is positioned within sleeve 24, which contains a pawl which engages the toothed core, permitting the toothed core to be advanced toward cone 32, but preventing the core from withdrawing from cone 32. This arrangement has not been completely satisfactory because the finite spacing of the teeth of the ratchet provides steps which may leave some space between the cone 32 and the toothed core. As a result, the adjustment of the yoke with respect to the cone of the CRT is not as precise as would be desired.

An inventive feature provides a method for mounting a deflection yoke on the neck and cone or funnel portions of a cathode ray tube, in which the yoke has a front mounting ring for mounting over the funnel structure portion of the cathode ray tube. The mounting ring has a plurality of hollow sleeves, each containing a movable member slideably received therein and movable along its longitudinal axis within a range of positions. Each of the sleeves contains means for continuously unidirectionally restricting the movement of its corresponding movable member along the longitudinal axis of the sleeve to a direction toward the funnel portion of the tube, the unidirectional restriction of said movable member being in substantially infinitesimal steps, so as to position said movable member at substantially any position within said range of positions. The method comprises the steps of placing the yoke in its desired position, with respect to the neck and funnel portions, fixing the rear portion of the yoke to the neck portion, and longitudinally moving each of the movable members within its corresponding sleeve into contact with the funnel portion of the cathode ray tube.

A deflection yoke according to an inventive arrangement comprises a front mounting ring for mounting the yoke over a funnel portion of a cathode ray tube. The mounting ring comprises a plurality of hollow sleeves each containing a movable member slideably received in a corresponding hollow sleeve. Each of the movable members is movable along its longitudinal axis within a range of positions. Each of the sleeves contains means for continuously restricting the movement of its corresponding movable member to a direction toward the funnel portion of the cathode ray tube. The unidirectional restriction of the movable member is in substantially infinitesimal steps, so as to position said member at substantially any position within said range of positions.

As a result of using the invention, a precise adjustment of the yoke to the CRT can be quickly made, without any tendency to rotate the yoke with respect to the tube.

Figure 1:
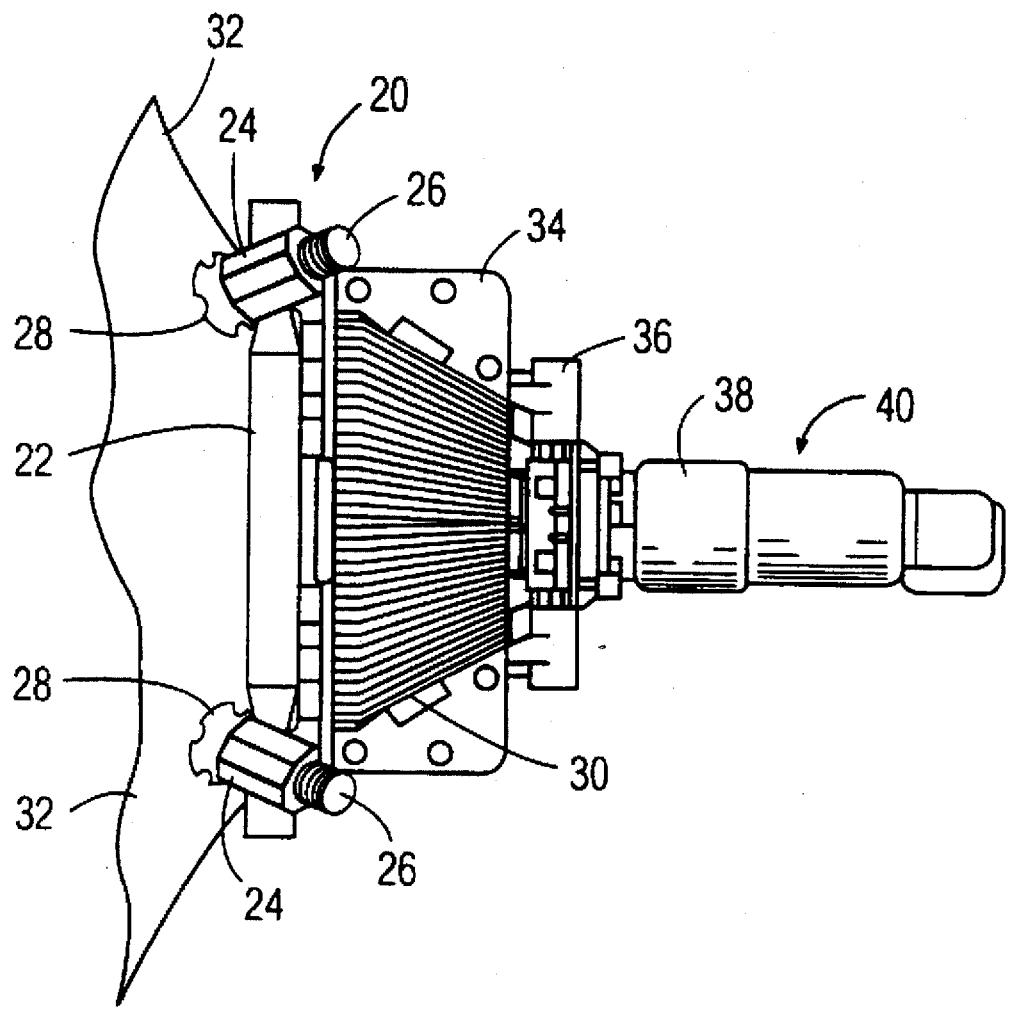
FIG. 1 is a pictorial side view of a prior art deflection yoke assembly as mounted on a CRT.
Figure 2:
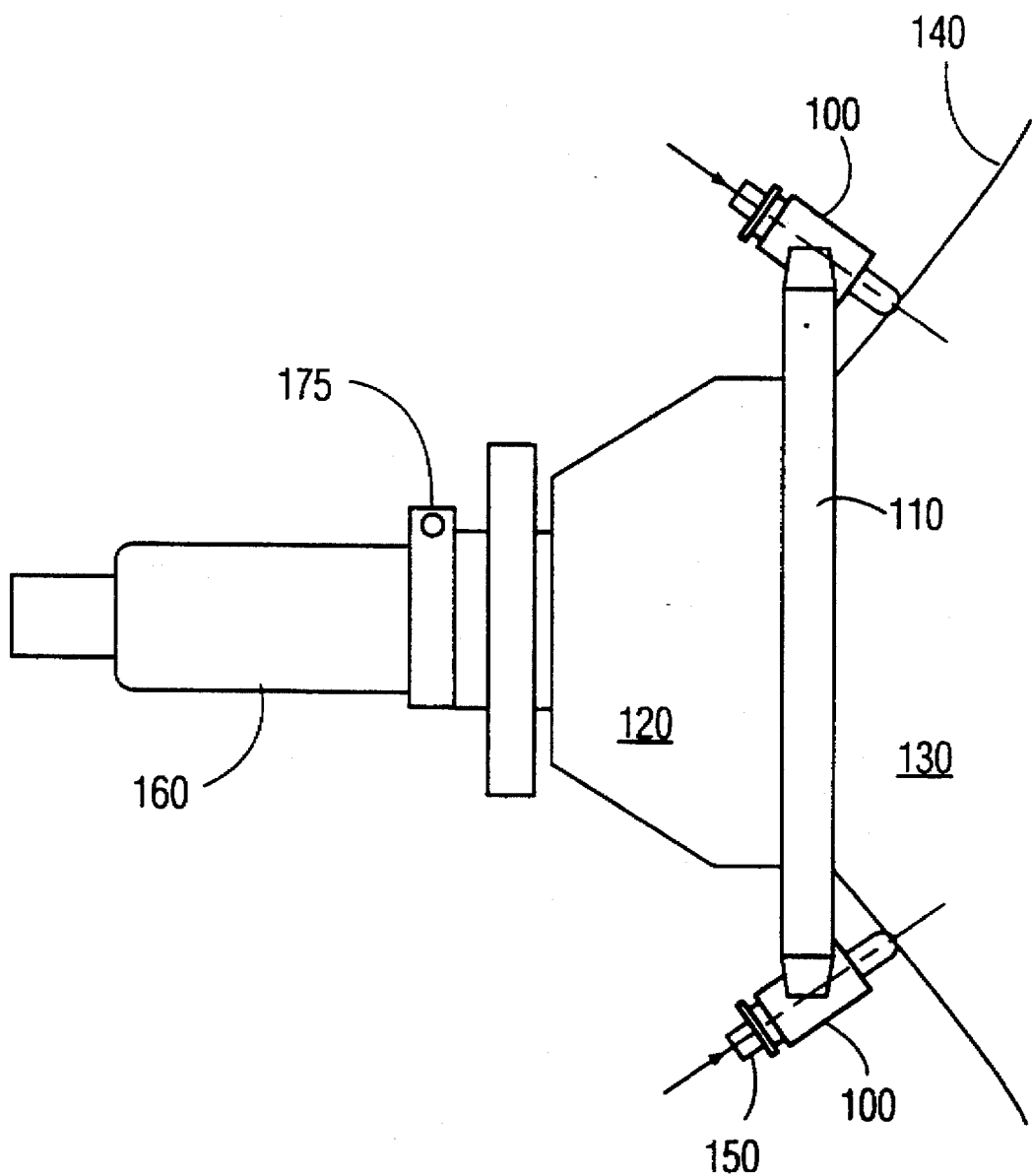
FIG. 2 is a side view of a deflection yoke, according to the invention, mounted on a cathode ray tube.

FIG. 2 schematically shows a deflection yoke 120 having a front mounting ring 110. Ring 110 mounts over the funnel portion 140 of cathode ray tube 130, which is shown only partially. The rear portion of the deflection yoke is fixed to the neck 160 of CRT 130 by clamp 175. Mounted on the ring 110 are four equally spaced mounting members 100, only two of which are visible in FIG. 2. Mounting members 100 are shown in their final position against the cone of cathode ray tube 130.

Figure 3:
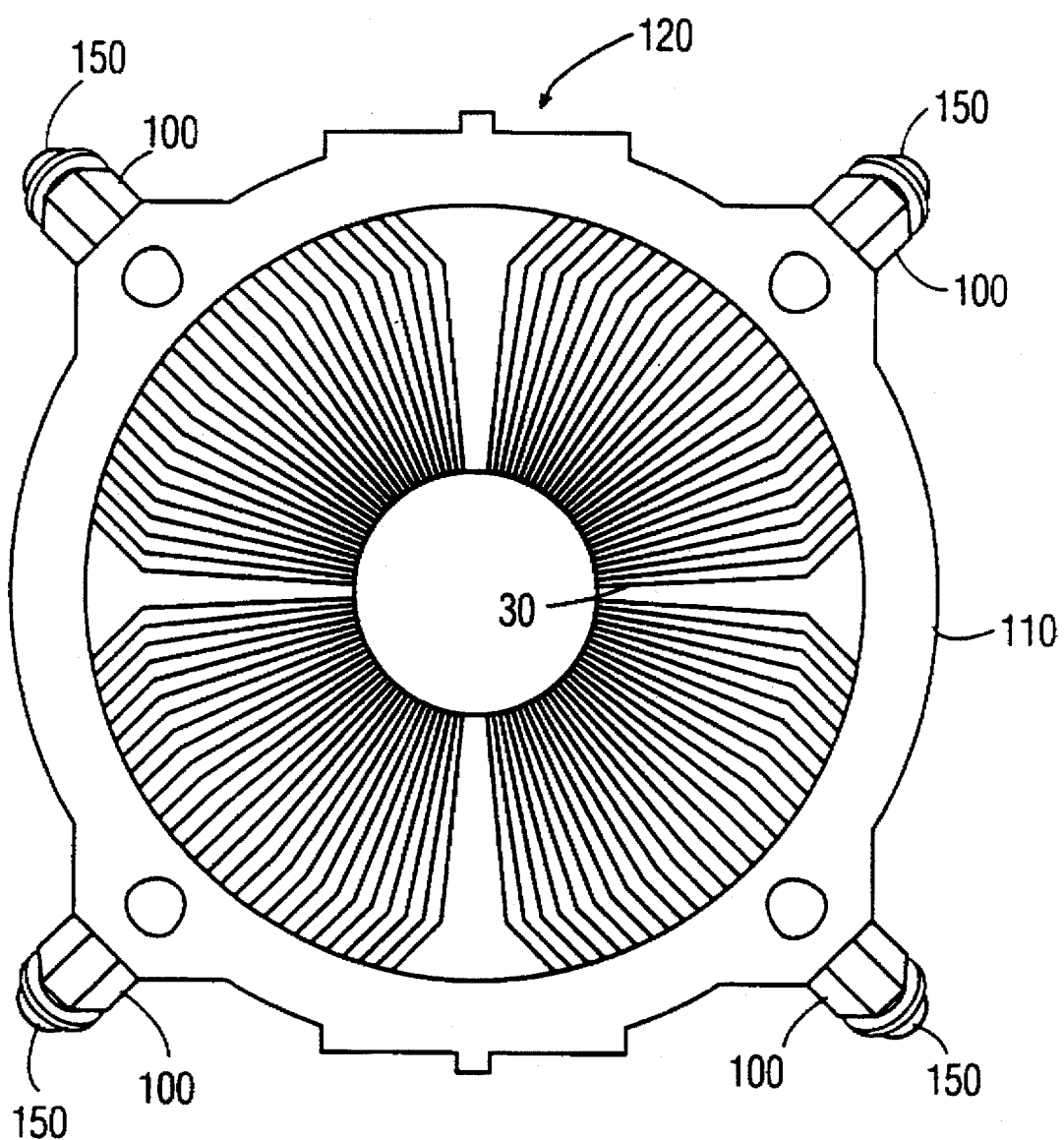
FIG. 3 is a front pictorial view of a deflection yoke according to the invention.

FIG. 3 shows a deflection yoke according to the invention, as viewed from the front. Yoke 120 includes a front mounting ring 110 which includes four inclined mounting members 100, which may be studs or sleeves. Each of mounting members 100 includes a plunger 150, which may be pushed into engagement with the core or funnel of a CRT.

Figure 4:
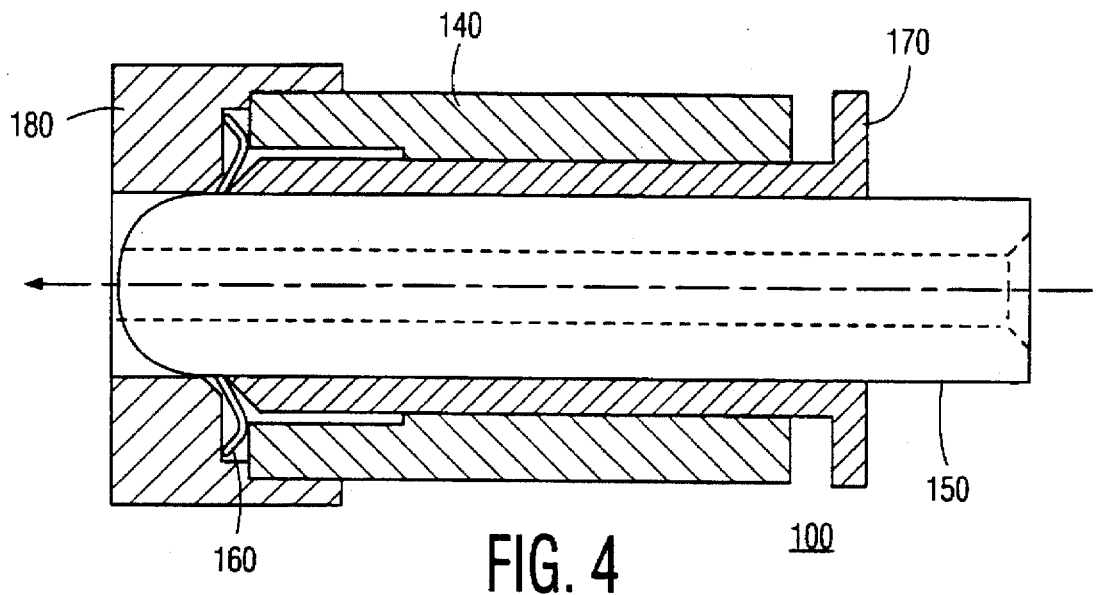
FIG. 4 shows a detailed view in cross section of an adjustment member according to the invention.

FIG. 4 shows mounting member 100 in more detail. Sleeve or body 140 is mounted on ring 110 (of FIG. 2). Body 140 contains a movable member or plunger 150 and internally toothed washer 160, which advantageously, continuously unidirectionally restricts the movement of movable member or plunger 150 in substantially infinitesimal steps within a range of positions, in such a manner that plunger 150 may easily be moved toward the funnel surface of the CRT (see FIG. 2), to any position within the range, but may be moved away from the funnel surface of the CRT only with great difficulty. Washer 160 is sandwiched between annular cap 180 and sleeve or body 140. Release cylinder 70 is coaxial with sleeve or body 140 and plunger 150, and positioned therebetween. Release cylinder 170 has a tapered end which engages washer 160. When release cylinder 170 is moved toward washer 160, it disengages washer 160 from plunger or movable member 150, so that plunger or movable member 150 may be moved away from the funnel surface (to the fight in FIG. 6).

The arrangement of internally toothed washer 160 with plunger 150, allows continuous adjustment of plunger 150, in contrast to the stepwise adjustment provided by the ratchet arrangement of the prior art. As a result, the instant invention advantageously provides much finer adjustment than the prior art, in a manner which results in a rapid adjustment process.

The arrangement of internally toothed washer 160 in movable member or plunger 150, together with release cylinder 170, advantageously allows movable member or plunger 150 to be withdrawn from in contact with the funnel portion of cathode ray tube 130, in the event that readjustment becomes necessary.

Figure 5:
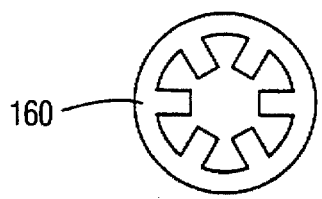
FIG. 5 is a front view of an internally toothed washer which is used in the invention.

FIG. 5 is a front view of internally toothed washer 160. This washer is slightly dished, as shown in FIG. 4. Such a washer is commercially available as Truarc Style 5115 or 5105, manufactured by Truarc Company, Long Island City, N.Y., USA. Other internally toothed washers may be used instead.

Figure 6:
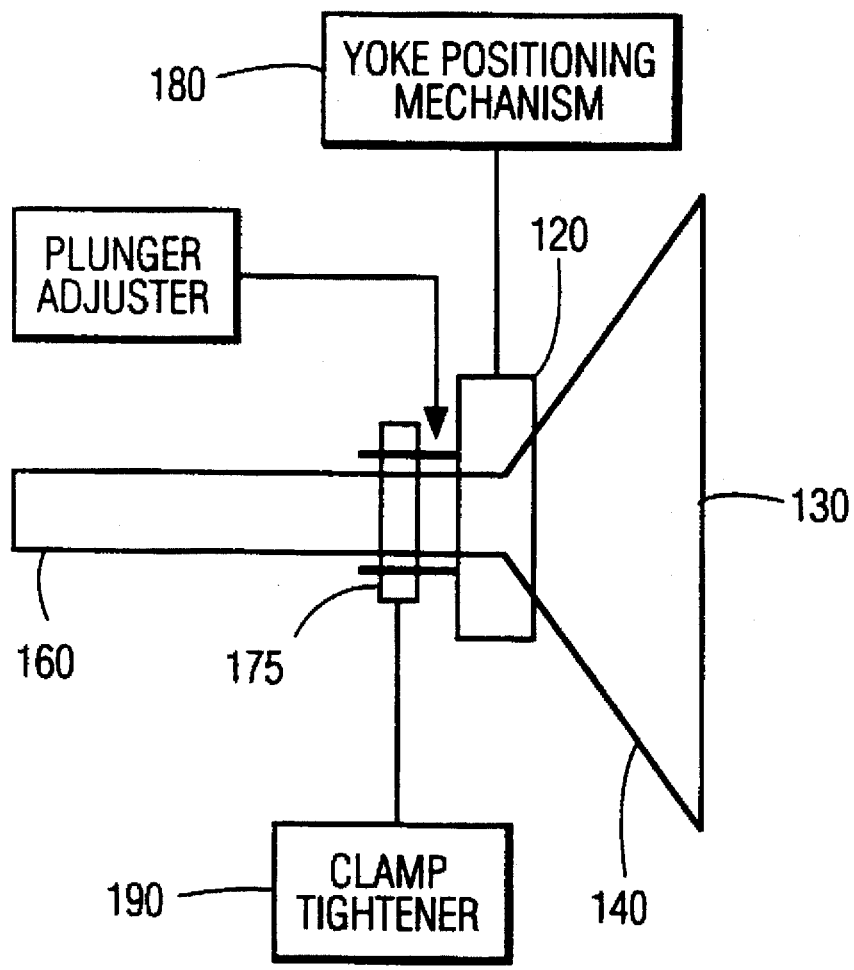
FIG. 6 is a schematic diagram of an apparatus for performing the inventive method.

FIG. 6 is a schematic diagram of an apparatus for performing the inventive method. Yoke positioning mechanism 180 positions deflection yoke 120 at a position on CRT 130 which produces proper purity, convergence, and raster shape. Such positioning mechanisms are known, and will not be further described.

When yoke 120 is in its proper position, clamp tightener 190 tightens clamp 175, so as to fix the rear portion of yoke 120 to neck 160 of CRT 130. After the rear portion of yoke 120 is fixed to neck 160 of CRT 130, plunger adjuster 200 gently pushes each of plungers 150 into contact with the funnel portion 140 of CRT 130. Since each of plungers 150 is restricted from moving away from funnel portion 140 of CRT 130, the yoke is thereby fixed in position with respect to CRT 130.

I claim:

1. A method for mounting a deflection yoke on the neck and funnel portions of a cathode ray tube, said yoke having a a front mounting ring for positioning said yoke with respect to said funnel portion, said mounting ring having a plurality of hollow sleeves, each containing a movable member slideably received therein, said movable member being movable along its longitudinal axis within a range of positions, each of said sleeves containing means for continuously restricting the longitudinal movement of its corresponding movable member, over its entire range of positions, to a direction toward the funnel portion of said tube, the restriction of said movable member being in substantially infinitesimal steps, so as to position said movable member at substantially any position within said range of positions, said method comprising the steps of:

(a) placing said yoke in its desired position with respect to said neck and funnel portions;

(b) fixing the rear portion of said yoke to said neck portion; and (c) longitudinally moving each of said movable members, within its corresponding sleeve, into contact with said funnel portion.

2. A method as defined by claim 1, in which each of said sleeves (100) contains means (170) for releasing said unidirectional restricting means, to allow unrestricted movement of said movable member (150) along the longitudinal axis of its corresponding sleeve, said method comprising the additional steps of:

a) activating at least one of said releasing means (170);

b) withdrawing the movable member (150) corresponding to said at least one releasing means (170);

c) repositioning said yoke (120); and d) longitudinally moving said movable member (150) into contact with said funnel portion (140).

3. A deflection yoke assembly for a cathode ray tube comprising:

(a) a front mounting ring for positioning said yoke with respect to a funnel portion of said cathode ray tube, said ring having a plurality of hollow sleeves; and (b) a plurality of movable members, each slideably received in a corresponding one of said hollow sleeves, each of said movable members being movable along its longitudinal axis within a range of positions, each of said sleeves containing means for continuously restricting the longitudinal movement of its corresponding movable member, over its entire range of positions, to a direction toward the funnel portion of said cathode ray tube, the restriction of said movable member being in substantially infinitesimal steps so as to position said movable member at substantially any position within said range of positions.

4. A deflection yoke as defined by claim 3, further comprising means for releasing said continuously restricting means.

5. A deflection yoke as defined by claim 4, in which said restricting means comprises an internally toothed washer whose teeth engage said movable member.

6. A deflection yoke as defined by claim 5, in which said means for releasing said restricting means comprises a release cylinder which engages the teeth of said washer.

7. A deflection yoke as defined by claim 6, in which said release cylinder (170) is coaxial with said movable member (150) and said sleeve (100).

8. A deflection yoke as defined by claim 5, comprising an annular cap (180) mounted on each of said sleeves (100), said washers (160) each being sandwiched between a corresponding sleeve (100) and a corresponding cap (180).

9. A deflection yoke as defined by claim 8, in which each of said caps (180) is coaxial with its corresponding sleeve (100).

* * * * *